Patented Dec. 3, 1929

1,738,449

UNITED STATES PATENT OFFICE

ERNST ROTHLIN AND FRITZ MÜLLER, OF BASEL, SWITZERLAND, ASSIGNORS TO THE FIRM CHEMICAL WORKS FORMERLY SANDOZ, OF BASEL, SWITZERLAND

ACRIDINE DERIVATIVE FOR THERAPEUTICAL PURPOSES

No Drawing. Application filed December 22, 1927, Serial No. 242,008, and in Switzerland January 6, 1927.

It has been found, that valuable acridine derivatives for therapeutical purposes can be obtained by coupling amino- and diaminoacridines, their halogenalkylates, or alkoxy substitution products of these compounds with bile acids to form bile acid salts. As bile acids for instance the unsaponified original acids as contained in the gall, such as glycocholic, taurocholic and glycodesoxycholic acid, further the products of saponification of same, such as cholic and desoxycholic acid, further the products of oxidation and partial anhydrization, such as dehydrocholic and apocholic acid enter into consideration.

The formation of these salts is easily carried out, if the two components are allowed to interact in suitable solvents. The interaction may also be performed in a convenient manner by double decomposition of salts of the original materials.

The new compounds possess a stronger antiparasitic action than the known acridine derivatives. They constitute in general orange yellow to yellow crystalline and micro-crystalline powders, soluble in hot alcohol and methanol, nearly insoluble in water and ether.

The following examples illustrate the invention:

*Example 1.*—5,2 g. of 3.6-diamino-10-methylacridinium-chloride are dissolved in 150 cm.$^3$ of water and poured, whilst stirring into a solution of 100 cm.$^3$ of an aqueous solution of 9,5 g. of sodium cholate. The salt precipitates as a paste, but may easily be crystallized from dilute alcohol. It crystallizes in form of fine yellow crystal needles. The new salt is difficultly soluble in water, relatively easily soluble in hot alcohol, in cold alcohol it is more difficultly soluble. The solutions show the characteristic fluorescence of acridine salts.

The salt obtained according to this example has most probably the following structural formula:

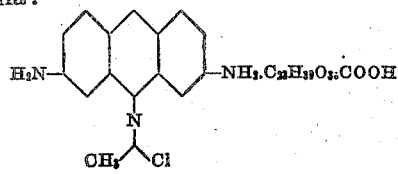

*Example 2.*—5,2 g. of 3.6-diamino-10-methylacridinium-chloride are dissolved in 200 cm.$^3$ of water and allowed to react, as described in Example 1, with the sodium salt from 8,2 g. of desoxycholic acid, dissolved in 250 ccm. of water. The new desoxycholic salt is a microcrystalline yellow powder nearly insoluble in water and rather difficultly soluble in alcohol, methanol, almost insoluble in ether. It possesses a strong antiparasitic action.

*Example 3.*—5,9 g. of 2-ethoxy-6.9-diaminoacridinehydrochloride and the sodium salt from 8,2 g. of desoxycholic acid are allowed to interact as described in the preceding examples. The desoxycholate of 2-ethoxy-6.9-diaminoacridine separates as a microcrystalline yellow powder. It is soluble in hot alcohol and methanol, nearly insoluble in ether and water.

*Example 4.*—5,9 g. of 2-ethoxy-6.9-diaminoacridinehydrochloride and 9,5 g. of sodium cholate are allowed to interact in the manner described in the preceding examples. The cholate of 2-ethoxy-6.9-diaminoacridine separates as a yellow microcrystalline powder. It is soluble in alcohol and methanol, difficultly soluble in chloroform, almost insoluble in acetone, ether and water. It possesses a strong antiparasitic action.

The salt obtained according to this example has most probably the following structural formula:

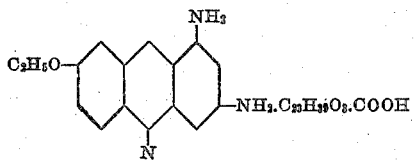

*Example 5.*—The sodium salt from 8,2 g. of apocholic acid and 5,9 g. of 2-ethoxy-6.9-diaminoacridine hydrochloride are allowed to interact as stated in the preceding examples. The apocholate 2-ethoxy-6.9-diaminoacridine separates as a yellow microcrystalline powder; it is soluble in hot alcohol and methanol, nearly insoluble in water and ether.

*Example 6.*—The sodium salt from 8,3 g. of choleinic acid and 5,9 g. of 2-ethoxy-6.9-diaminoacridinehydrochloride are allowed to interact as previously stated. The choleinate of 2-ethoxy-6.9-diaminoacridine separates as a yellow microcrystalline powder. It is soluble in alcohol and methanol, nearly insoluble in water and ether.

What we claim is:

1. As new articles of manufacture, bile acid salts of amino-acridines, forming orange yellow to yellow crystalline and microcrystalline powders, soluble in hot alcohol and methanol, nearly insoluble in water and ether, possessing a strong antiparasitic action.

2. As new articles of manufacture, the salts of saponified bile acids with amino-acridines, forming orange yellow to yellow crystalline and microcrystalline powders, soluble in hot alcohol and methanol, nearly insoluble in water and ether, possessing a strong antiparasitic action.

3. As new articles of manufacture, the cholates of amino-acridines, forming orange yellow to yellow crystalline and microcrystalline powders, soluble in hot alcohol and methanol, nearly insoluble in water and ether, possessing a strong antiparasitic action.

4. As new articles of manufacture, the cholates of diaminoacridine derivatives, forming orange yellow to yellow crystalline and microcrystalline powders, soluble in hot alcohol and methanol, nearly insoluble in water and ether, possessing a strong antiparasitic action.

5. As new articles of manufacture, the cholates of alkoxydiaminoacridine derivatives, forming orange yellow to yellow crystalline and microcrystalline powders, soluble in hot alcohol and methanol, nearly insoluble in water and ether, possessing a strong antiparasitic action.

6. As new articles of manufacture, the cholate of 2-alkoxy-6.9-diaminoacridines, forming orange yellow to yellow crystalline and microcrystalline powders, soluble in hot alcohol and methanol, nearly insoluble in water and ether, possessing a strong antiparasitic action.

7. As a new article of manufacture, the cholate of 2-ethoxy-6.9-diaminoacridine, forming orange yellow to yellow crystalline and microcrystalline powder, soluble in hot alcohol and methanol, nearly insoluble in water and ether, possessing a strong antiparasitic action.

In witness whereof we have hereunto signed our names this 12th day of December, 1927.

ERNST ROTHLIN.
FRITZ MÜLLER.